United States Patent [19]

Samuel

[11] Patent Number: 4,691,930
[45] Date of Patent: Sep. 8, 1987

[54] WHEELED VEHICLE

[76] Inventor: Michael Samuel, Flat J, Queens Drive, Finsbury Park, London, United Kingdom, N42HW

[21] Appl. No.: 864,189

[22] PCT Filed: Sep. 4, 1985

[86] PCT No.: PCT/GB85/00396

§ 371 Date: May 30, 1986

§ 102(e) Date: May 30, 1986

[87] PCT Pub. No.: WO86/01480

PCT Pub. Date: Mar. 13, 1986

[30] Foreign Application Priority Data

Sep. 5, 1984 [GB] United Kingdom ............... 8422410

[51] Int. Cl.4 .......................................... B62K 13/00
[52] U.S. Cl. ................................. 280/7.1; 280/278; 280/279; 280/282
[58] Field of Search ............ 280/7.1, 282, 287, 278, 280/87.04 R, 87.05, 279

[56] References Cited

U.S. PATENT DOCUMENTS

| 1,282,433 | 10/1918 | Kinnard | 280/87.04 R |
| 1,347,384 | 7/1920 | Kinnard | 280/87.04 R |
| 1,379,305 | 5/1921 | Johns | 280/7.1 |
| 2,603,499 | 7/1952 | Netzband | 280/87.04 R |
| 3,933,373 | 1/1976 | Gammelgaard | 280/287 |
| 4,079,957 | 3/1978 | Blease | 280/282 |
| 4,274,647 | 6/1981 | Drake, Jr. | 280/87.04 A |
| 4,546,991 | 10/1985 | Allen et al. | 280/282 |

FOREIGN PATENT DOCUMENTS

| 3135956 | 4/1982 | Fed. Rep. of Germany | 280/281 R |
| 2409907 | 6/1979 | France | 280/282 |
| 747786 | 4/1956 | United Kingdom | 280/7.1 |
| 2008506 | 6/1979 | United Kingdom | 280/282 |
| 1571887 | 7/1980 | United Kingdom | 280/282 |

Primary Examiner—John J. Love
Assistant Examiner—Eric Culbreth
Attorney, Agent, or Firm—Shelsinger, Arkwright, Garvey & Fado

[57] ABSTRACT

A convertible wheeled vehicle which is capable of assembly into any one of a plurality of different vehicles includes a front wheel frame assembly. A wheel is mounted to the front wheel frame assembly. A chassis assembly has at least one wheel. A pair of vertically spaced plates extends from the front wheel assembly and a tubular connector associated with the chassis assembly is disposed therebetween. A pin extends between the plates and through the tubular connector for securing the chassis in any one of a plurality of orientations.

20 Claims, 10 Drawing Figures

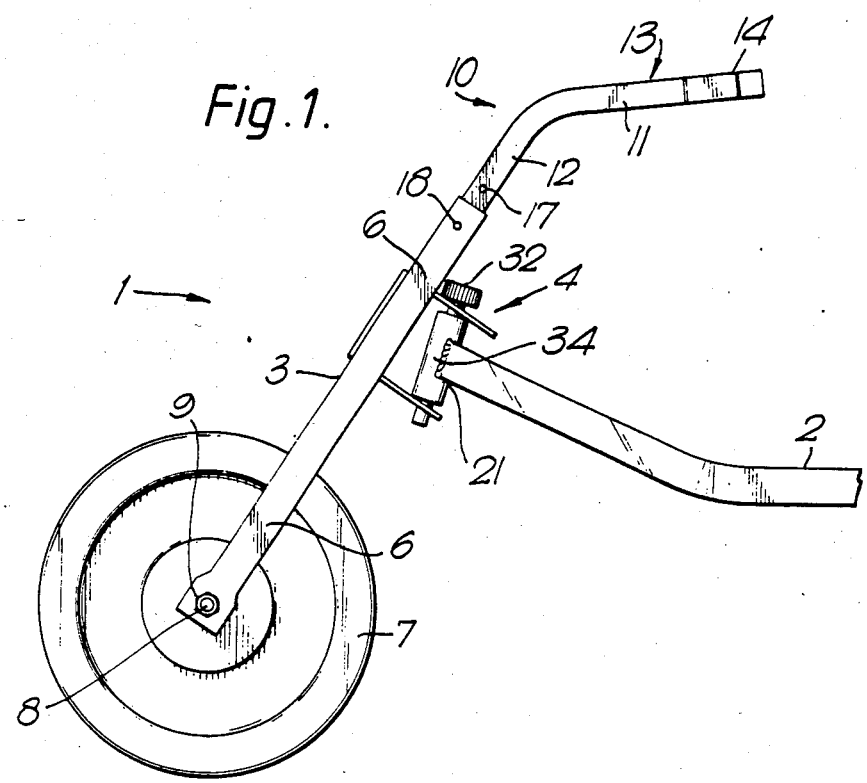
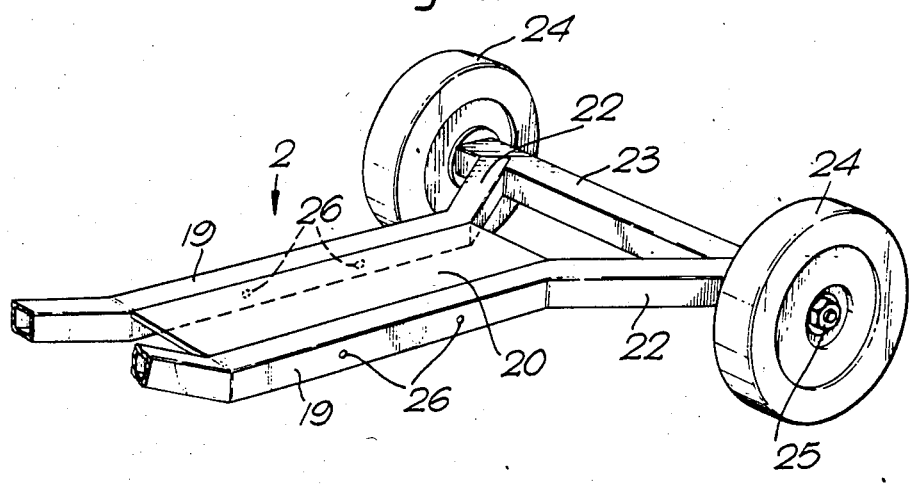

WHEELED VEHICLE

DESCRIPTION OF INVENTION

This invention relates to a wheeled vehicle, and particularly to such a vehicle suitable for use by children.

A wide variety of tricycles, scooters, go-karts etc, are available for use by children and, in order to meet the desires of children, it is often necessary for a single family to purchase separately two or more of these vehicles for a single child. Clearly the child can only use one of these vehicles at a time and thus, at any given time any remaining vehicle is not used. If more than one vehicle is bought, then more space is required to store the vehicles, for example during the winter months, and the expense of purchasing more than one vehicle may be prohibitive, considering the relatively short length of time that a child will be able to use a particular size of vehicle.

The present invention seeks to provide a vehicle which may obviate or reduce the problems outlined above.

Accordingly, the invention provides a kit of parts for assembly to form a wheeled vehicle, which kit of parts may be assembled in a plurality of relative positions to form a plurality of different vehicles.

The vehicles may advantageously be selected from the group comprising a tricycle, a bicycle, a go-kart and a scooter. Preferably, the kit of parts comprises a front wheel frame assembly that is connectable with a chassis assembly in a plurality of relative orientations, the front wheel assembly being adapted to carry at least one wheel, and the chassis assembly being adapted to carry at least one wheel. Desirably, the front wheel frame assembly is pivotably connectable with the chassis assembly via connection means comprising a pair of spaced apart plates connected to the front wheel frame and adapted to receive and retain therebetween a mounting member fixed at one end of the chassis assembly.

Conveniently, the mounting member be fixed in one of at least two selectable angular orientations relative to said plates. Desirably, the front wheel frame assembly presents, at its lower end, a pair of forks for receiving a wheel for rotation therebetween and, preferably, the front wheel frame removably receives at its upper end, a handlebar assembly, the handlebar assembly being selectively positionable in a plurality of orientations relative to said front wheel frame.

Advantageously, the handlebar assembly is received within the front wheel frame for telescoping movement relative thereto, there being means for retaining the handlebar assembly in at least one selected relative telescopic position.

Preferably, the handlebar assembly has a first linear portion to be received in the front wheel frame, and a second portion inclined thereto, said handlebar assembly being receivable within the front wheel frame assembly in a first position or in a second reversed position.

In a preferred embodiment the chassis is cranked, and the chassis is connectable with the front wheel frame assembly with the chassis in a first position, or with the chassis in a second inverted position.

In order that the invention may be more readily understood, and so that further features thereof may be appreciated, a vehicle embodying the invention will now be described, by way of example, with reference to the accompanying drawings, in which:

FIG. 1 illustrates schematically the front part of one configuration of a vehicle made from a kit of parts in accordance with the invention;

FIG. 2 illustrates schematically the rear part of said one configuration of the vehicle;

Figure 3:
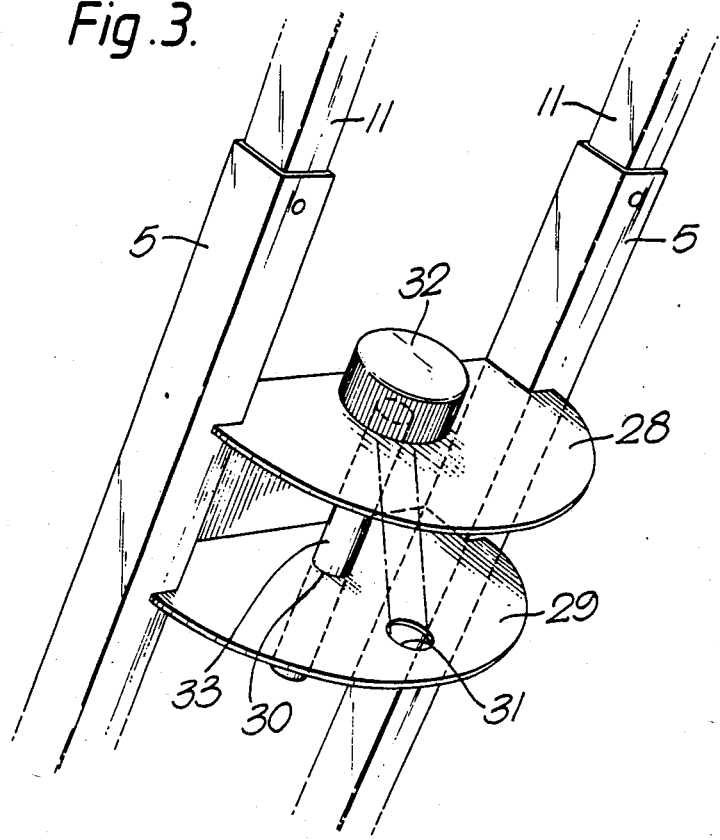
FIG. 3 illustrates one preferred form of chassis engagement means.

Referring to the drawings, and especially to FIGS. 1 and 2, a vehicle embodying the invention is generally indicated 1. The vehicle 1 comprises a rear chassis assembly 2 connectable with a front frame assembly 3 via chassis engagement means generally indicated at 4. The front frame assembly 3 comprises a pair of spaced apart elongate members 5, as best shown in FIG. 3. At their lower regions the members 5 define front forks 6, only one of which is shown in FIG. 1, for removably receiving a wheel 7. The wheel 7 is mounted for rotation between the forks 6 on an axle member 8 fixed to the forks 6 by retaining nuts 9.

Pedals, not shown may be provided for direct drive of the front wheel. However, the pedals should be easily removable so that they can be discarded or stored when not required.

Figure 5:
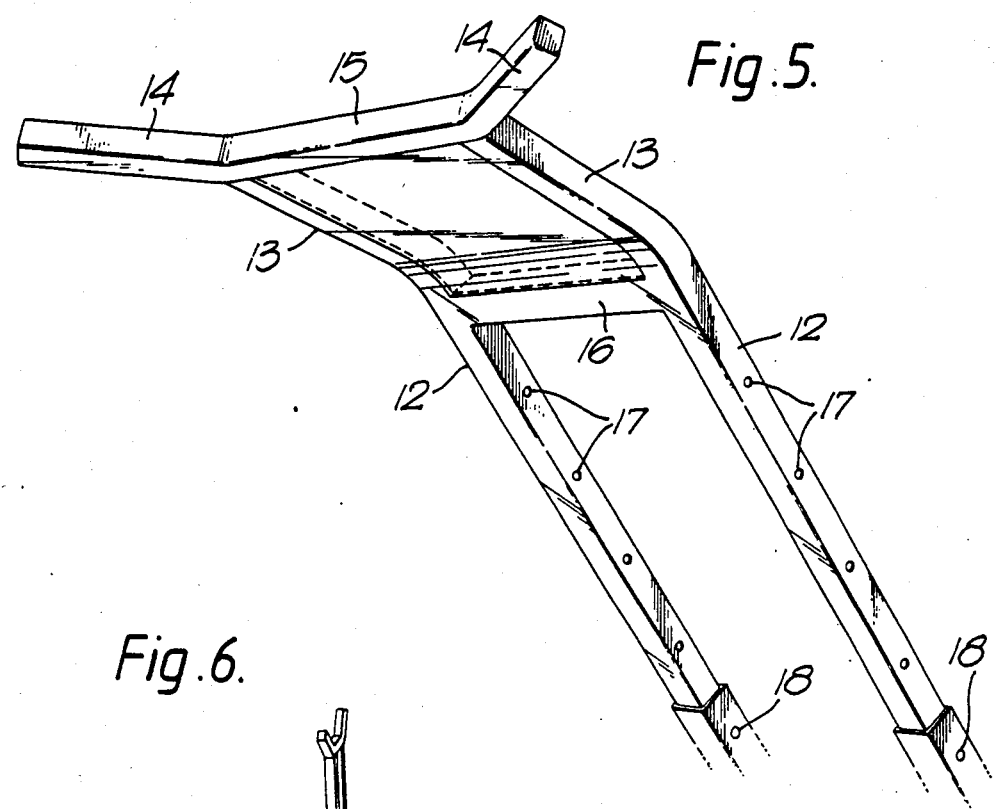
FIG. 5 illustrates the cooperation between a handlebar assembly and the front frame assembly of the vehicle of FIG. 1.

At least in their upper region, the members 5 are hollow and are adapted to receive, for telescoping movement therein, a handlebar assembly 10. The handlebar assembly is illustrated in FIG. 5. The handlebar assembly 10 comprises two parallel spaced apart elongate elements 11 that are connected together as will now be described. Each element 11 can be considered to comprise two sections, namely a lower telescoping section 12, that is adapted to be received within the upper region of the sectional elements 5 of the front frame assembly 3, and an upper inclined section 13. The elements 11 are located parallel with each other in corresponding orientation. A handle assembly interconnects the free ends of the inclined sections 13 of the elements 11, defining outwardly and upwardly extending handgrip portions 14 and a transverse connector portion 15. The elements 11 are also interconnected by a crossbar 16 positioned just below the juncture of the inclined portion 13 and the telescoping portion 12 of each element 11. The region bounded by the connector portion 15, the inclined portions 13 and the crossbar 16 may be provided with an infill panel. As will become apparent, the provision of the portion 13 at an inclination relative to the axis to the telescoping section 12 of each handlebar element 11 is an important feature of this invention. To allow adjustment of the height of the handlebar assembly 10 relative to the front frame assembly 3, a plurality of holes 17 are provided in each of the elements 11 to cooperate with a single pair of holes 18 in the front frame assembly that receive a retaining pin [not shown] to fix selectively the relative position of the handlebar assembly 10.

Referring again to FIGS. 1 and 2, the chassis assembly 2 comprises a pair of square cross-section elements 19. In a mid region of the chassis assembly 2 the elements 19 are substantially parallel and are connected by a plate assembly 20. Towards the front of the chassis assembly 2 the elements 19 extend upwardly [in the orientation illustrated] and inwardly to meet at an apex 21 that cooperates with the engagement means 4 to removably connect the chassis assembly 2 with the front frame assembly 3 whilst allowing pivotal movement of the front frame assembly about the point of connection for steering. The elements 19 extend rearwardly to form rear axle supporting members 22 which extend outwardly from, but in the same horizontal plane [as viewed in the Figures] as the mid region of the chassis. A square cross-sectioned tube 23 that interconnects the free ends of the members 22 and extends outwardly beyond the free ends of the members 22 receives and retains an axle [not shown] that supports rear wheels 24 which are retained in position by wheel nuts 25.

Figure 4:
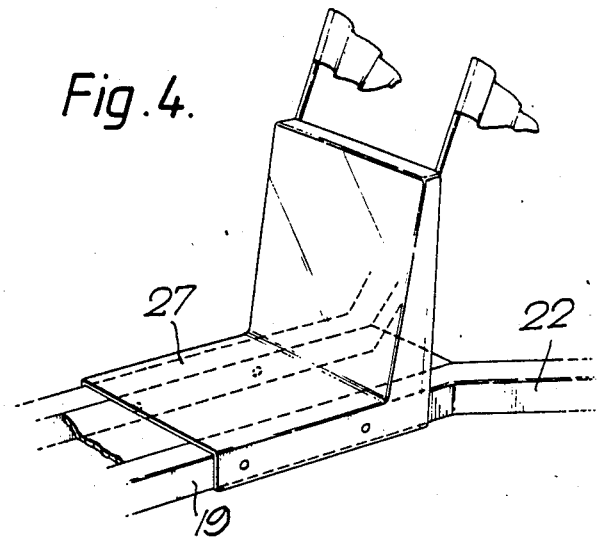
FIG. 4 illustrates the positioning of a seat in said one configuration of the vehicle.

Pin receiving holes 26 are provided in the parallel portion of the chassis assembly 2 to receive, removably, retaining pins for positioning a seat assembly 27 [shown in FIG. 4].

Referring to FIGS. 1 and 3, the chassis engagement means 4 comprises an upper plate 28 and a lower plate 29 that are fixably connected to, and project rearwardly from the elements 5 of front frame assembly 3. The plates 28 and 29 are spaced apart, but lie in parallel planes. As best shown in FIG. 3 a single hole is provided substantially centrally in the upper plate 28 and a pair of holes 30, 31 are provided in the lower plate 29. A bolt 32 is passable through the hole in the upper plate 28 to pass either through the front hole 30 in the plate 29, the bolt 32 then being parallel to the axis of the elements 5 or through the hole 31 in the lower plate 29 whereby the bolt 32 then bolts at an incline relative to the axis of the elements 5. To facilitate this selective cooperation of the bolt 32, the hole in the plate 28 and the rearward hole 31 in the lower plate are formed slightly larger than the hole 30. For example, if the shaft of the bolt is 10 mm in diameter, the hole 30 may be 12 mm in diameter and the hole in the plate 28 and the hole 31 may be 14 mm in diameter.

To facilitate connection of the chassis assembly 2 with the frame assembly 3, the chassis assembly 2 is provided, at its apex 21, with a tubular connector assembly 34 that is adapted to receive the shaft 33 of the bolt 32. By passing the bolt 33 through the upper plate 28, the connector assembly 34 and a selected one of the holes 30, 31 in the plate 29, the chassis assembly can be connected as desired to the front frame assembly 3. The lower end of the bolt 33 will be provided with an appropriate nut. It will be appreciated that the relative positions of the chassis assembly 2 and the front frame assembly 3 can be selected by appropriate selection of either the hole 30 or the hole 31 for receiving the bolt 32.

As will be appreciated, the angled nature of both the handlebar assembly 10 and the chassis assembly 2 enable a variety of combinations of the respective parts of the vehicle 1 so that the vehicle can be configured either as a scooter, a go-kart or as a tricycle. The configurations of the parts of the vehicle to form these alternative configurations are shown in FIGS. 6 to 10.

Figure 6:
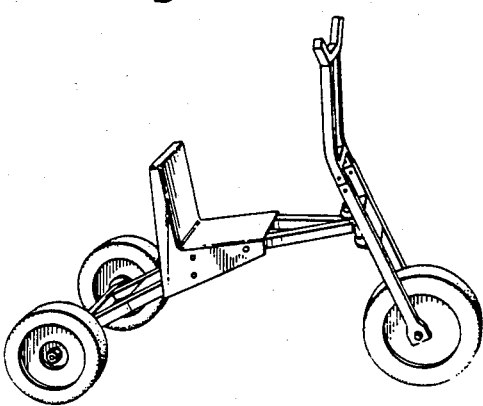
FIG. 6 illustrates a vehicle in accordance with the invention arranged in a tricycle configuration.
Figure 7:
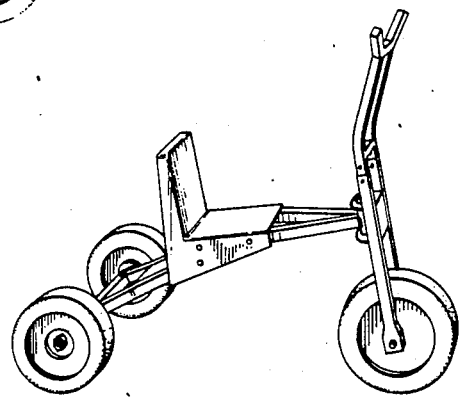
FIG. 7 illustrates the vehicle of FIG. 5 in a modified tricycle configuration.

FIGS. 6 and 7 show two alternative configurations of the vehicle to form a tricycle. To form the tricycle the chassis assembly is inverted from the configuration shown in FIGS. 1 and 2 and the inverted chassis is connected with the front frame assembly 3 by passing the bolt 34 either through the rear hole 31, to form the arrangement shown in FIG. 6, or through the front hole 30 to form the arrangement of FIG. 7. In either case the handlebar assembly 10 is reversed from the position shown in FIG. 1 to provide the typical more upright handlebar arrangement for a child's tricycle. It will be appreciated that pedals can be positioned for direct drive of the front wheel as desired and that the seat member 27 can be fixed to the chassis assembly 2 via pins retained in the holes 26. The handlebar assembly 10 is typically positioned in its lowest possible telescoping position.

Figure 8:
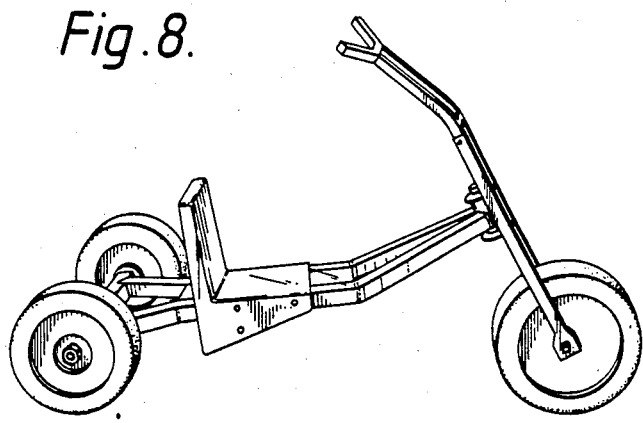
FIG. 8 illustrates a vehicle in accordance with the invention in a go-kart configuration.
Figure 9:
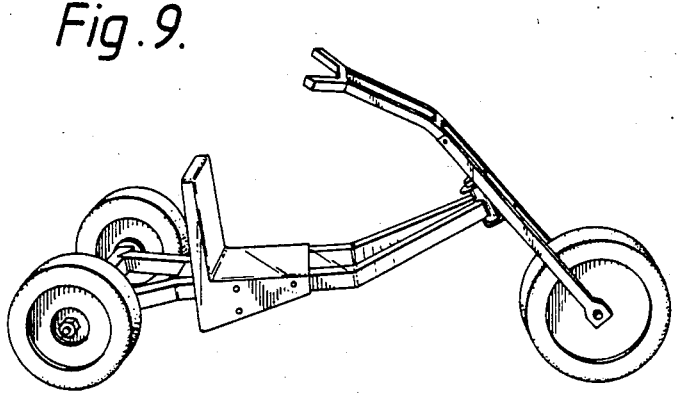
FIG. 9 illustrates a vehicle in accordance with the invention in a modified go-kart configuration.
Figure 10:
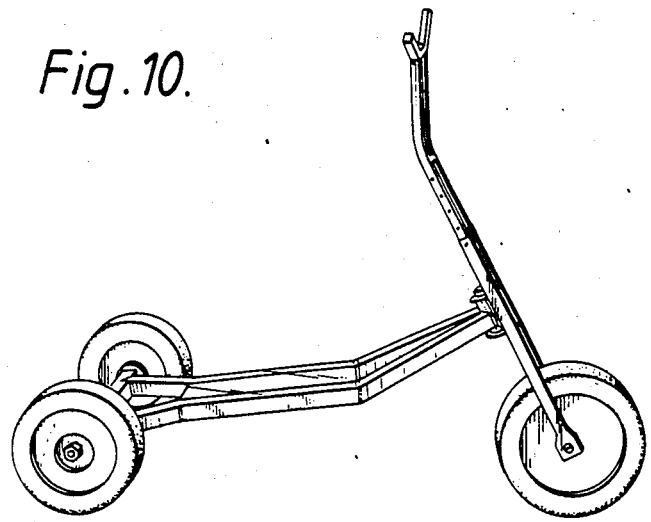
FIG. 10 illustrates a vehicle in accordance with the invention in a scooter configuration.

To arrange the parts of the vehicle as a go-kart [as shown in FIGS. 8 and 9], the handlebar assembly 10 is reversed, to the orientation shown in FIG. 1, and the chassis assembly 2 is also inverted to the orientation of FIGS. 1 and 2. Again bolt 34 may be secured either in hole 30 or hole 31 of the plate 29 to select one of the two possible positions of the handlebars as desired. The handlebar assembly 10 may be telescoped to any comfortable position. Again the seat 27 is suitably positioned and retained on the chassis assembly 2.

Finally, to arrange the vehicle parts as a scooter, the chassis assembly is positioned in the same configuration as for the go-kart of FIG. 8 with the bolt 32 positioned in the hole 30 to provide a more upright position of the handlebars. The handlebar assembly 10 is reversed to the same configuration as for the tricycle of FIGS. 6 and 7 and is telescoped outwardly to the desired height for a scooter. In this configuration the seat 27 is omitted and the plate 20 provides a foot support.

It will be appreciated that any suitable materials can be used for manufacture of the frame assemblys and for the wheels and that the frame assemblys may be of square, circular or any other convenient cross-section. Additional elements, such as mud-guards, may also be provided.

Whilst the illustrated embodiment may be assembled as either a tricycle, a go-kart or as a scooter, it will be appreciated that other arrangements, such as a bicycle or a unicycle may be formed as alternative arrangements in other embodiments.

I claim:

1. A convertible wheeled vehicle which is capable of assembly into any one of a plurality of different vehicles, the convertible vehicle comprising:
   (a) a front wheel frame assembly;
   (b) means for mounting at least one wheel to said front wheel frame assembly;
   (c) a chassis assembly;
   (d) means for mounting at least one wheel to said chassis assembly; and,
   (e) means for pivotally connecting said chassis assembly to said front wheel frame assembly in a selected one of a plurality of different orientations of said chassis assembly, each orientation of said chassis assembly corresponding to a different vehicle, said connecting means comprising a pair of vertically spaced plates rigidly connected to said front wheel frame assembly, a mounting assembly fixed at one end of said chassis assembly and adapted to be received between said spaced plates, and retaining means for retaining said mounting assembly between said spaced plates in one of at least two selectable orientations relative to said plates.

2. A vehicle according to claim 1 wherein said mounting assembly is tubular and receives a bolt passable through a hole in each of said spaced apart plates.

3. A vehicle according to claim 2, wherein a single hole is provided in one of said plates and at least two holes are provided in the other of said plates, said bolt being passable through said single hole, and selectively passable through either one of said two holes.

4. A vehicle according to claim 1, wherein said front wheel frame assembly presents, at its lower end, a pair of forks for receiving a wheel for rotation therebetween.

5. A vehicle according to claim 1, wherein said front wheel frame assembly removably receives at an upper end a handlebar assembly, said handlebar assembly being selectively positionable in a plurality of orientations relative to said front wheel frame assembly.

6. A vehicle according to claim 5, wherein said handlebar assembly is received within the front wheel frame assembly for telescoping movement relative thereto, there being means for retaining said handlebar assembly in at least one selected relative telescopic position.

7. A vehicle according to claim 5, wherein said handlebar assembly has a first linear portion to be received in said front wheel frame assembly, and a second portion inclined thereto, said handlebar assembly being receivable within said front wheel frame assembly in a first position or in a second, reversed, position.

8. A vehicle according to claim 1 wherein said chassis assembly is cranked.

9. A vehicle according to claim 8, wherein said chassis assembly is connectable with said front wheel frame assembly with the chassis assembly in a first position, or with said chassis assembly in a second inverted position.

10. A vehicle according to claim 1 wherein a seat is fixable to said chassis assembly.

11. A vehicle according to claim 10, wherein said seat is fixable to a top portion of said chassis assembly.

12. A vehicle assembly convertible into any one of a number of vehicles, comprising:
(a) a longitudinally extending front wheel assembly including handlebar means at a first end thereof and a wheel at a second end thereof;
(b) a chassis assembly having a first end portion connectable with said front wheel assembly and at least a first wheel at an opposite end portion thereof; and,
(c) means for connecting said first end portion with said front wheel assembly and comprising first and second longitudinally spaced plates carried by and extending from said front wheel assembly, one of said plates having a first aperture therethrough and the other of said plates having second and third spaced apart apertures therethrough, and pin means operatively associated with said first end portion and said pin means being receivable in said first aperture and selectively receivable in one of said second and third apertures so that said front wheel assembly is free to pivot about said pin means and is disposed at a selected angle to said chassis assembly.

13. The vehicle of claim 12, wherein:
(a) said handlebar means being removably received within said front wheel assembly.

14. The vehicle of claim 13, wherein:
(a) said handlebar means including a first linear portion removably received in said front wheel assembly and a second portion angularly disposed and extending therefrom.

15. The vehicle of claim 13, wherein:
(a) means are operably associated with said front wheel assembly for fixing said handlebar means at a preselected position.

16. The vehicle of claim 12, wherein:
(a) means are provided for removably fastening a seat assembly to said chassis assembly.

17. The vehicle of claim 12, wherein:
(a) said first end portion includes a tubular connector assembly through which said pin means extends, said tubular connector assembly being disposed between said plates.

18. The vehicle of claim 12, wherein:
(a) said chassis assembly is selectively connectable with said front wheel assembly in any one of a plurality of orientations, each orientation being associated with one of said second and third apertures and with a specific vehicle type.

19. The vehicle of claim 12, wherein:
(a) a pair of wheels is rotatably mounted to said opposite end portion.

20. The vehicle of claim 19, wherein:
(a) said chassis assembly includes first and second tubular assemblies, each of said tubular assemblies extending from one wheel of said pair of wheels and to said first end portion.

* * * * *

UNITED STATES PATENT AND TRADEMARK OFFICE
CERTIFICATE OF CORRECTION

PATENT NO. : 4,691,930

DATED : September 8, 1987

INVENTOR(S) : Michael Samuels

It is certified that error appears in the above-identified patent and that said Letters Patent is hereby corrected as shown below: Title page Item [19] and [76]

Inventor: Michael Samuels

Signed and Sealed this

Ninth Day of February, 1988

Attest:

DONALD J. QUIGG

Attesting Officer

Commissioner of Patents and Trademarks